(12) United States Patent
Rousselle et al.

(10) Patent No.: US 9,371,006 B2
(45) Date of Patent: Jun. 21, 2016

(54) METHOD AND DEVICE FOR THE OPTIMIZED RECHARGING OF AN ELECTRIC BATTERY

(75) Inventors: Mélaine Rousselle, Vanves (FR); Gaizka Alberdi, Vanves (FR)

(73) Assignees: Electricite de France, Paris (FR); Electricite Reseau Distribution France, Paris La Defense Cedex (FR)

( * ) Notice: Subject to any disclaimer, the term of this patent is extended or adjusted under 35 U.S.C. 154(b) by 181 days.

(21) Appl. No.: 14/342,949

(22) PCT Filed: Sep. 6, 2012

(86) PCT No.: PCT/FR2012/051989
§ 371 (c)(1),
(2), (4) Date: Mar. 5, 2014

(87) PCT Pub. No.: WO2013/034853
PCT Pub. Date: Mar. 14, 2013

(65) Prior Publication Data
US 2014/0225572 A1    Aug. 14, 2014

(30) Foreign Application Priority Data
Sep. 7, 2011    (FR) ...................................... 11 57959

(51) Int. Cl.
*H02J 7/00* (2006.01)
*B60L 11/18* (2006.01)
*H02J 7/02* (2016.01)

(52) U.S. Cl.
CPC ......... *B60L 11/1809* (2013.01); *B60L 11/1844* (2013.01); *H02J 7/0052* (2013.01);
(Continued)

(58) Field of Classification Search
CPC ............. H02J 17/00; H02J 3/14; H02J 5/005;
H02J 7/0068; H02J 7/04; H02J 2003/003;
H02J 3/28; H02J 7/00; H02J 7/0022; H02J
7/0054; H02J 7/0073; H02J 7/008; H02J
7/041; Y04S 30/12
USPC .......................................... 320/137, 143, 145
See application file for complete search history.

(56) References Cited

U.S. PATENT DOCUMENTS

| 5,998,968 A * | 12/1999 | Pittman | H02J 7/0093 320/130 |
| 2009/0322287 A1* | 12/2009 | Ozeki | H02J 7/0068 320/145 |
| 2011/0156651 A1 | 6/2011 | Christensen | |

FOREIGN PATENT DOCUMENTS

| CN | 102044723 A | 5/2011 |
| EP | 2 219 278 A1 | 8/2010 |

(Continued)

OTHER PUBLICATIONS

Bashash et al., "Plug-in Hybrid Electric Vehicle Charge Pattern Optimization for Energy Cost and Battery Longevity," retrieved from internet website: http://faculty.ce.berkeley.edu/moura/pubs/JPS_ChgPatternOpt_Preprint.pdf; Journal of Power Sources, 196.1, pp. 541-549 (2011).

(Continued)

*Primary Examiner* — Nghia Doan
(74) *Attorney, Agent, or Firm* — Drinker Biddle & Reath LLP (57) ABSTRACT

A method for the optimized recharging of the electric battery of at least one electric system, particularly an electric vehicle, using an electric recharging device, in which the electric battery is recharged during at least one charging time interval which is part of an available charging time period initiated by connection of the electric battery recharging system to the electric recharging device and which is determined as a function of a charging curve associated with this electric recharging device.

14 Claims, 5 Drawing Sheets

(52) U.S. Cl.
CPC .............. *H02J 7/02* (2013.01); *B60L 2240/80* (2013.01); *Y02E 60/721* (2013.01); *Y02T 10/7005* (2013.01); *Y02T 10/7011* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

FOREIGN PATENT DOCUMENTS

| | | |
|---|---|---|
| JP | 2010-110044 A | 5/2010 |
| WO | WO 2009/012018 A2 | 1/2009 |

OTHER PUBLICATIONS

Caramanis et al., "Management of Electric Vehicle Charging to Mitigate Renewable Generation Intermittency and Distribution Network Congestion," Joint 48th IEEE Conference on Decision and Control and 28th Chinese Control Conference, Shanghai, P.R. China, pp. 4717-4722 (Dec. 16-18, 2009).

Clement-Nyns et al., "Analysis of the Impact of Plug-In Hybrid Electric Vehicles on Residential Distribution Grids by using Quadratic and Dynamic Programming," EVS International Battery, Hybrid and Fuel Cell Electric Vehicle Symposium, Stavanger, Norway, World Electric Vehicle Journal, vol. 3, pp. 1-11 (2009).

Rousselle, "Impact of the Electric Vehicle on the Electric System," Master Thesis, EG201X, pp. 1-98, retrieved from internet website: http://www.ee.kth.se/php/modules/publications/reports/2009/XR-EE-ES_2009_018.pdf (Dec. 2009).

Sojoudi et al., "Optimal charging of plug-in hybrid electric vehicles in smart grids," Power and Energy Society General Meeting, 2011 IEEE, San Diego, CA, Abstract (Jul. 2011).

Sundstrom et al., "Optimization Methods to Plan the Charging of Electric Vehicle Fleets," International Journal on Communication, 1(2), pp. 1-6 (2010).

English language translation of Office Action issued in related application CN 201280055588.X, Oct. 19, 2015, 6 pages.

* cited by examiner

METHOD AND DEVICE FOR THE OPTIMIZED RECHARGING OF AN ELECTRIC BATTERY

The invention relates to the field of managing the recharging of electric batteries, including the recharging of electric batteries of electric vehicles.

There are currently many electric systems comprising a system for storing electrical energy, in particular a system consisting of one or more electric batteries and their associated recharging system, which can be connected to an electrical grid for recharging.

These electric systems include electric vehicles having an electrical energy storage system which can be connected to power supply terminals by means of a recharging plug. The power supply terminals are each connected to the electrical grid.

Usually, charging the electric battery of such electric systems begins the moment this battery is connected to the electrical grid and ends when this electric battery is disconnected from the electrical grid.

In the specific case of electric vehicles, the recharging begins the moment the recharging plug of the electric vehicle is plugged into the power supply terminal and continues as long as the electric vehicle is not unplugged, meaning until the user of the vehicle wishes to claim his vehicle or as long as the battery is not full.

This type of charging is not optimal, however, because the recharging does not consider constraints related to the grid, to the electric battery to be charged, or to the user of the electric system to be recharged.

The constraints of the electrical grid to which the power supply terminal is connected can be expressed as the load curve of a transformer or a delivery point, which is not uniform over time. For example, a transformer is stressed when the load exceeds its rated capacity.

The higher the load on the transformer, the more the transformer heats up, which accelerates its aging. In addition, large fluctuations in the load can result in sudden expansions and mechanical stresses. Ultimately, this transformer can grow louder due to the widening gaps.

As for the electric battery to be recharged, it can have widely varying charge levels when it is plugged into a power supply terminal, which determines the required amount of electrical energy to be obtained from the power supply terminal, and therefore the charging time required to reach a full charge.

Finally, concerning the constraints of the user of the electric recharging system, the user connects and disconnects the system at times which vary greatly depending on his schedule. When the electric system is an electric car, the driver of the vehicle parks and reclaims his vehicle at times that depend on his schedule, which affects the available charging time of the power supply terminal.

The present invention seeks to overcome the above disadvantages by proposing an optimized recharging method which takes into account both the constraints related to the electrical grid and those related to the user of the electric system to be recharged, as well as constraints related to the electric battery to be recharged, and which better protects the recharging devices of the electrical grid.

For this purpose, it proposes a method for the optimized recharging of the electric battery of at least one electric system by an electric recharging device, wherein the electric battery is recharged during at least one charging time interval which is part of an available charging time period initiated by connection of the electric battery recharging system to the electric recharging device, determined as a function of a load curve associated with this electric recharging device.

According to one advantageous embodiment, the determination of the charging time interval comprises sampling the load curve over the available charging time period in order to obtain a set of load curve power values associated with consecutive time intervals, and sorting, in ascending order, the load curve power values in order to obtain a set of sorted load curve power values respectively associated with one of the time intervals, the electric battery being recharged during at least one charging time interval corresponding to a time interval associated with the first value of the sorted load curve power values.

According to one particular embodiment, the electric battery is recharged during K charging time intervals selected from among the time intervals associated with the first values of the sorted load curve power values, K being an integer greater than or equal to one, dependent on the level of electrical energy contained in the electric battery when the electric battery recharging system is connected to the electric recharging device.

The number K can advantageously be determined based on the level of electrical energy contained in the electric battery when the electric battery is connected to the electric recharging device, and on the charge profile of said electric battery.

In one embodiment, the recharging of the electric battery comprises, for each of the consecutive time intervals, enabling the recharging of the electric battery during the time interval if this time interval is one of the charging time intervals and disabling the recharging of the electric battery during the time interval if the time interval is not one of the charging time intervals.

In this embodiment, the recharging of the electric battery advantageously further comprises, for each of the consecutive time intervals, comparing the load value associated with this time interval to a limit capacity value, and enabling the recharging of the electric battery during the time interval only if the load value associated with this time interval is less than the limit capacity value, and disabling the recharging of the electric battery during the time interval if the load value associated with this time interval is greater than or equal to the limit capacity value.

In another embodiment, the available charging time period is deduced from the time when the electric battery recharging system is connected to the electric recharging device and from an indication concerning the charging end time provided by the user of the electric vehicle.

In another embodiment, the method comprises a prior verification of the duration of the available charging time period as a function of the length of time necessary for fully recharging the electric battery, with the recharging of the electric battery during at least one charging time interval occurring only if the duration of the available charging time period is greater than the length of time required for fully recharging the electric battery.

In a particularly advantageous embodiment, the electric battery has substantially no memory effect. In particular, the electric battery is preferably a Lithium-Ion battery. In addition, in one particular embodiment, the electric system is an electric vehicle.

The invention further provides a computer program comprising instructions for implementing the steps of the above method when this program is executed by a processing unit of an electric recharging system. Such a program is to be considered a product under the protection sought by this patent application.

The invention also provides an optimized recharging device for recharging the electric battery of at least one electric system, connected to an electrical grid and comprising at least one connection port suitable for connection to the electric battery recharging system, the device being configured to implement the steps of the above method after the electric battery recharging system is connected to the connection port of the optimized recharging device.

Finally, the invention proposes an optimized recharging system for recharging an assembly composed of at least one electric system comprising an electric battery, the optimized recharging system comprising an electrical grid and at least one electric recharging device as described above, connected to said electrical grid. In one embodiment, the system further comprises a remote computer system, connected to the electric recharging device and comprising a processing unit suitable for carrying out the steps of the above method.

Other features and advantages of the invention will appear from the following detailed description and the accompanying drawings in which.

Figure 1:
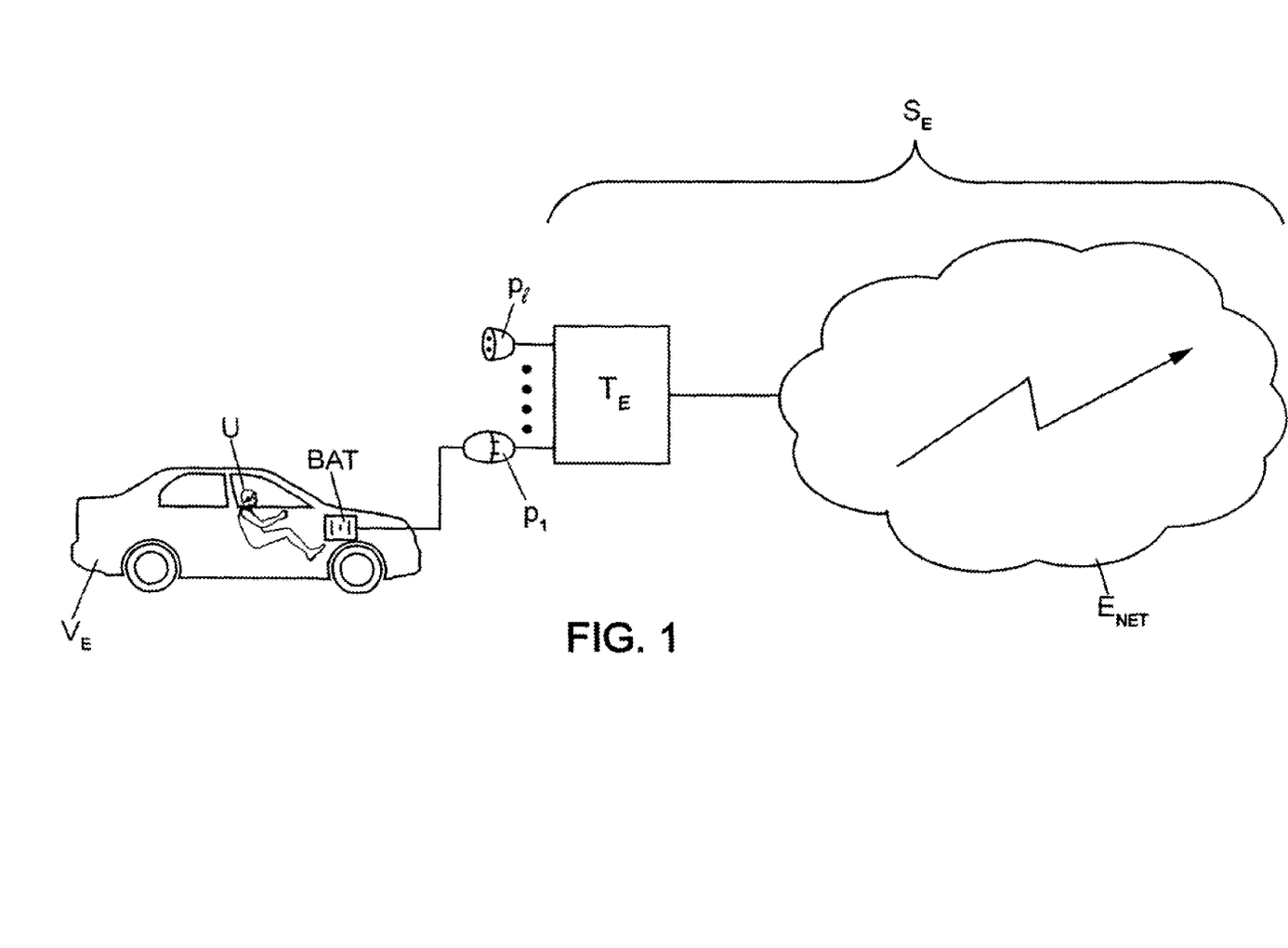
FIG. 1 illustrates an optimized system for recharging electric vehicles according to the present invention.

The following will first refer to FIG. 1, which illustrates an optimized system for recharging the electric battery of an electric system according to the present invention.

This optimized recharging system, designated by $S_E$ in FIG. 1, comprises at least one electric recharging device $T_E$, suitable for connecting to the recharging system for the electric battery BAT of one or more electric systems $V_E$ in order to recharge it.

A single electric recharging device $T_E$ and a single electric system $V_E$ are represented in FIG. 1, purely for illustrative purposes, but the optimized recharging system $S_E$ can include any number of electric recharging devices in order to be able to recharge any number of electric systems.

The electric recharging device $T_E$ is itself connected to an electrical grid $E_{NET}$ where it obtains the electrical energy required for recharging and may consist of a power transformer, for example. The device $T_E$ thus has one or more connection ports $p_1, \ldots, p_I$ suitable for connecting to the electric battery BAT of an electric system in order to recharge it using the electricity provided by the electrical grid $E_{NET}$.

The electric system $V_E$ includes one or more electric batteries BAT associated with a battery recharging system. This electric system $V_E$ is used by a user U who connects and disconnects the recharging system for this electric battery BAT to the electric recharging device $T_E$ according to his schedule.

Purely for illustrative purposes, FIG. 1 represents the electric system $V_E$ as an electric vehicle, as the present invention has particularly advantageous applications for this particular type of electric system. In this illustrative example, the electric vehicle $V_E$ is driven by a user U who connects and disconnects the recharging system for the electric battery BAT to the electric recharging device $T_E$ according to his schedule.

Such an electric vehicle can be a car, a moped, or any other system having a battery that can be recharged from the electrical grid.

In the optimization of the electric recharging system $V_E$, different constraints thus apply to the optimized recharging system described in FIG. 1:

the constraints related to the recharging electrical grid, such as the load curve associated with the electric recharging device $T_E$;

the constraints related to the electric battery to be recharged, such as the charge profile of the electric battery BAT, or the electrical energy still stored in the battery when the user U plugs the battery BAT into the electric recharging device $T_E$, and the constraints related to the user U himself, particularly his schedule, which affect the times when he connects and disconnects the electric system to/from the electric recharging device $T_E$, and therefore affects the available charging time for the battery BAT.

In the present invention, the electric battery BAT of the electric system $V_E$ is recharged during at least one charging time interval $\Delta T_{chg}(i)$ within an available charging time period Td, which is initiated by connecting the recharging system for this electric battery BAT to the electric recharging device $T_E$, which allows optimizing the recharging of this battery based on certain constraints related to the user's schedule.

The charging time interval $\Delta T_{chg}(i)$ is determined as a function of a load curve TLC associated with the electric recharging device $T_E$, which also allows optimizing the charging of the electric battery BAT based on constraints related to the electric recharging device $T_E$, and therefore to the optimized recharging system $S_E$.

Such a load curve TLC can be estimated at a given moment, for example on the basis of an expected load variation, or updated during charging so as to ensure ongoing load optimization according to the state of the electric recharging device $T_E$ at that moment in time. By way of illustration, the load curve TLC may be estimated on the basis of predefined load curve models or load curve models calculated from a recorded history of loads at the electric recharging device $T_E$. Updating the load curve TLC may be achieved through real-time sampling of the load on the electric recharging device $T_E$. Such updating is particularly attractive in cases where a large number of batteries are connected and are recharging at the same time, which can lead to large variations in the load curve TLC.

Figure 2:
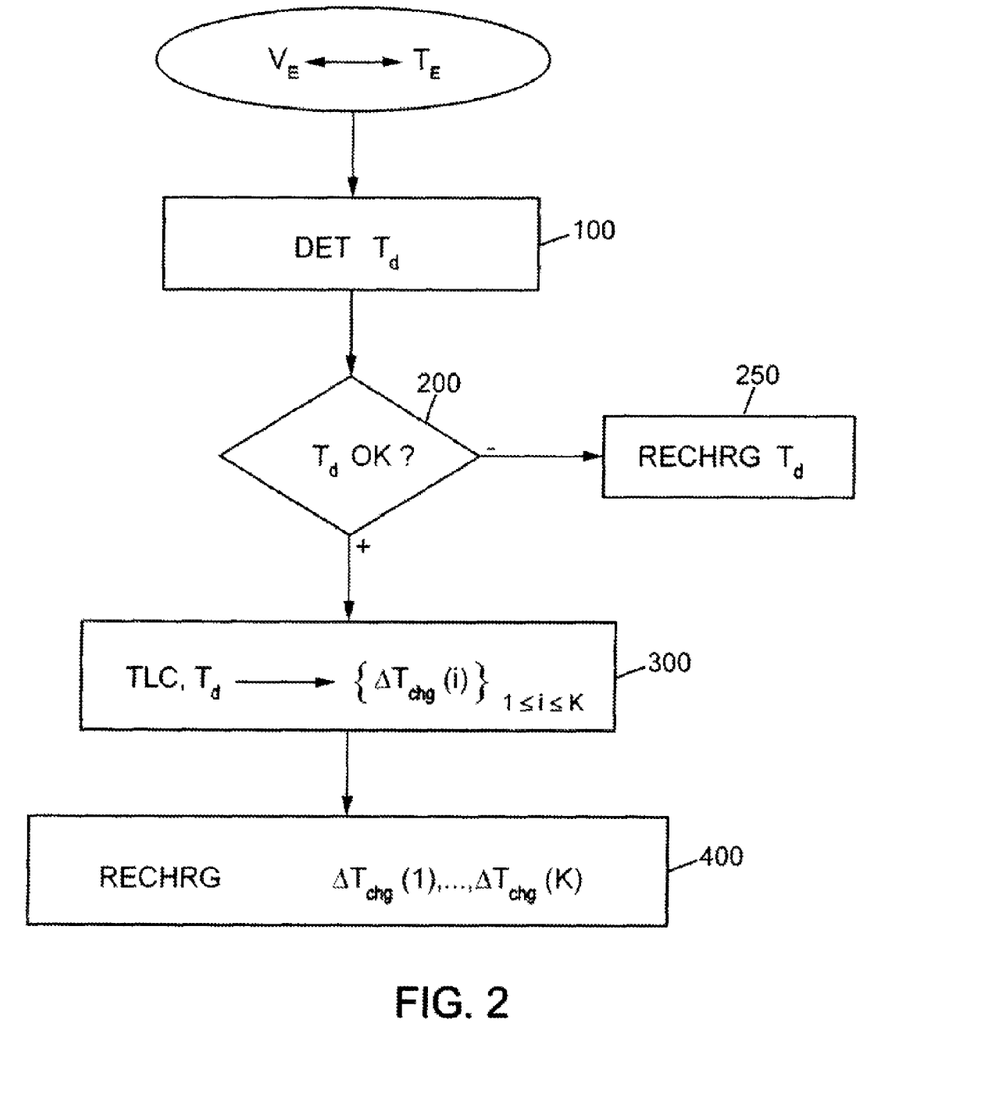
FIG. 2 illustrates the steps of an optimized method for recharging an electric vehicle according to the present invention.

We will now refer to FIG. 2, which illustrates the steps of an optimized recharging method for recharging the battery of an electric system according to the present invention.

This method concerns the optimized recharging of the electric battery of one or more electric systems $V_E$ by an electric recharging device $T_E$, the electric system $V_E$ comprising an electric battery BAT associated with a recharging system that can be connected to this electric recharging device $T_E$ in order to perform this recharging. The optimized recharging of a single electric system $V_E$ is described below for illustrative purposes, but the method can be applied to the recharging of any number of electric systems.

This method may first include the determination (step 100) of an available charging time period Td, performed to take user constraints into account, especially his schedule, which influences the time available for recharging the electric battery BAT.

Thus, the moment $t_A$ when the electric battery BAT recharging system is connected to the electric recharging device $T_E$ allows determining the start of the available charging time period Td. In other words, this moment $t_A$ when the electric battery is connected begins the available charging time period Td.

To determine the moment $t_p$ corresponding to the end of the available charging time period Td, it is advantageous to ask the user to indicate the time he plans to disconnect the electric system $V_E$ (for example the time he expects to reclaim his electric vehicle), for example the time he anticipates leaving for work in the morning. The user U can provide an indication concerning this charging end time $t_D$, for example via a dedicated web interface on a smartphone or on the dashboard of the electric vehicle used.

Once this available charging time period Td is determined, it is advantageous to verify beforehand (step 200) that the available charging time period Td is sufficient, so that the optimized recharging process is only begun if such is the case. Otherwise, a conventional recharging process can be implemented (step 250) for the entire duration of the available charging time period Td, as will be explained below.

Figure 3:
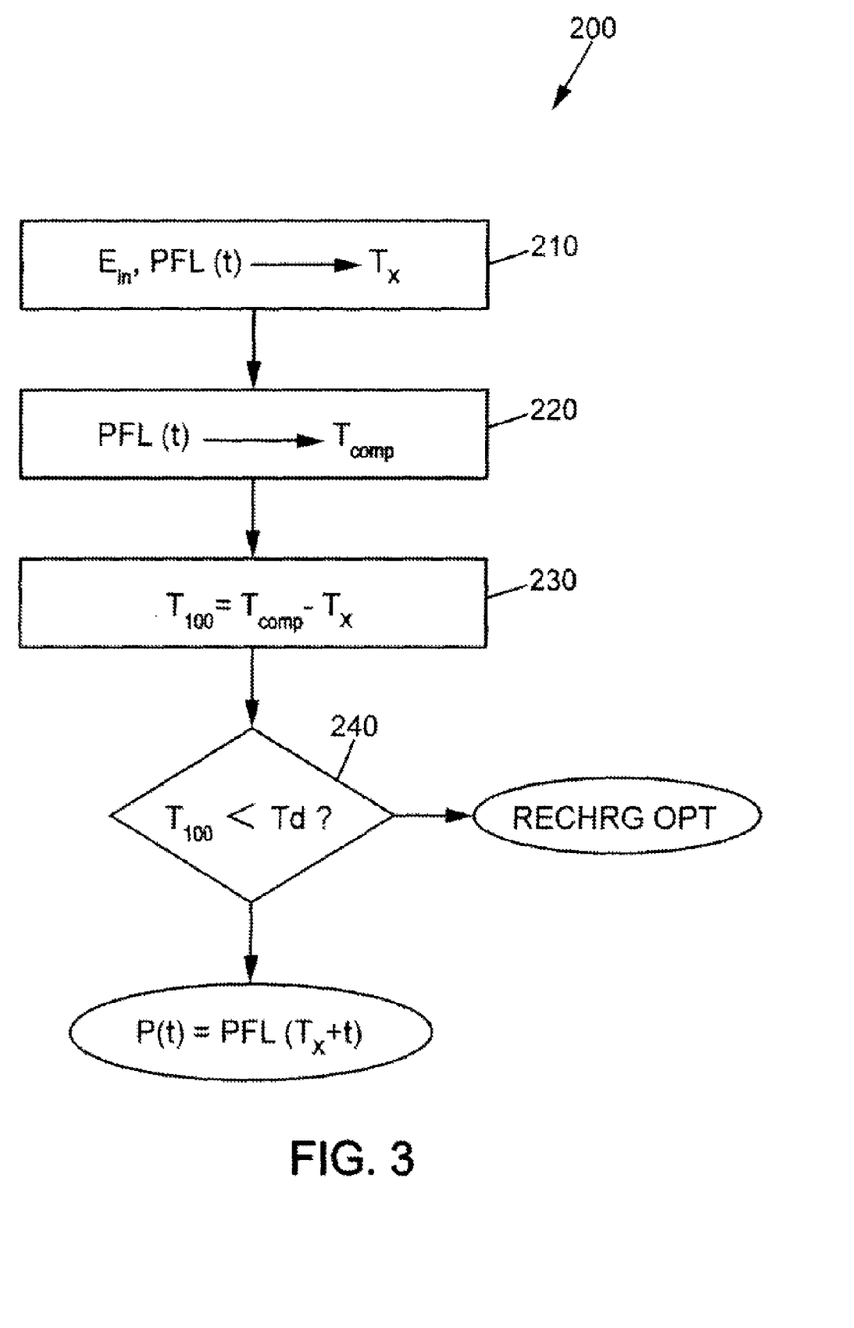
FIG. 3 illustrates an implementation of a pre-verification step of the optimized recharging method according to the present invention.

FIG. 3 illustrates one embodiment of such a pre-verification step 200.

In this embodiment, a partial charging period Tx is first calculated (step 210), corresponding to the level of residual electrical energy $E_{in}$, remaining in the electric battery BAT when it is connected to the recharging device $T_E$. In other words, this partial charging period Tx corresponds to the time needed to recharge the electric battery BAT from a state where it is empty of energy (a zero state of charge SoC) to the level of residual electrical energy $E_{in}$.

Figure 4:
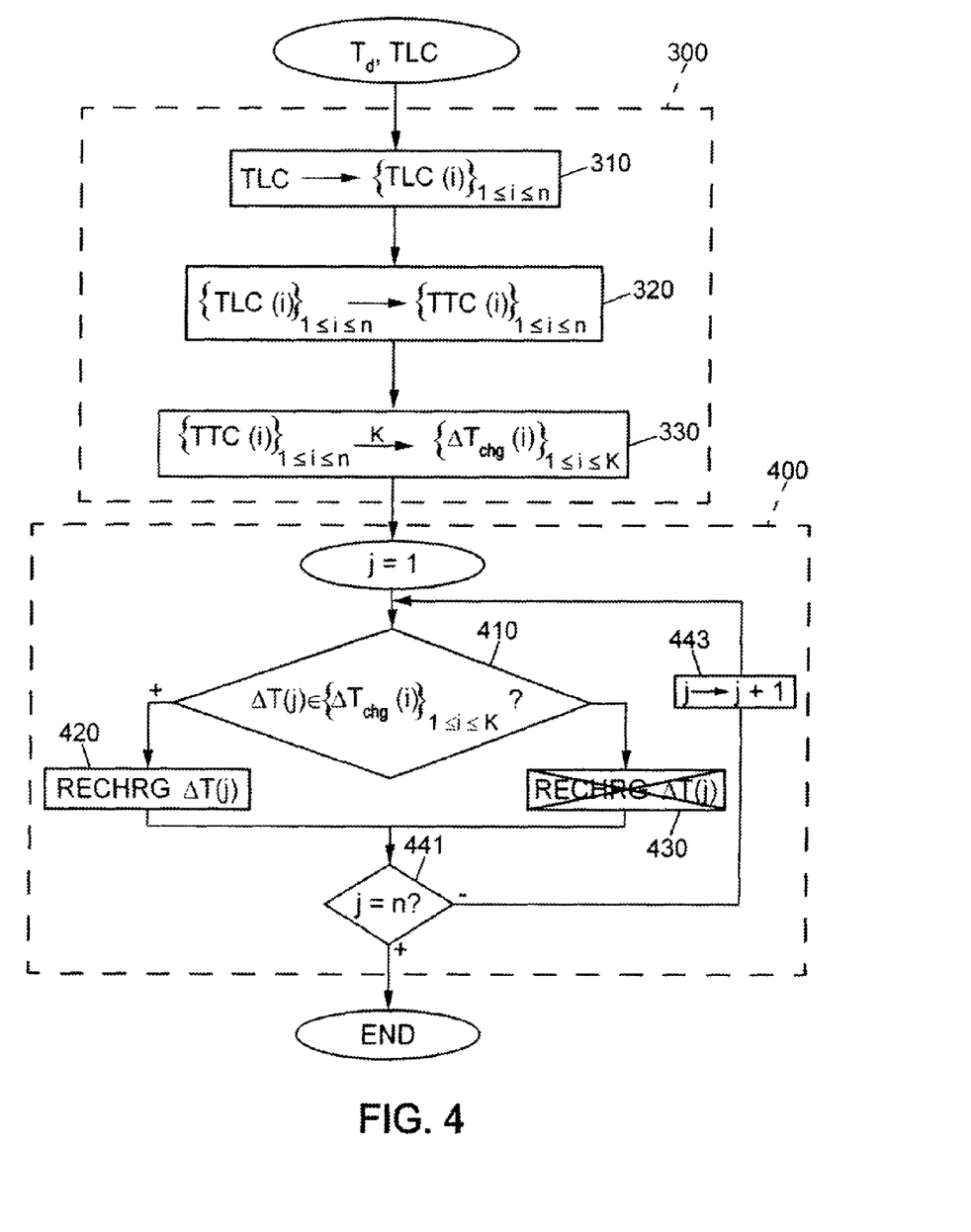
FIG. 4 illustrates an implementation of the steps of determining recharging and charging time intervals, of the recharging method according to the present invention.

In the particular case where the information available at the time of connection consists of a state of charge $SoC_0$ of the battery BAT, this level of residual electrical energy $E_{in}$, is calculated beforehand using the following equation (1):

$$E_{in} = E_{expl} \cdot SoC_0 \quad (1)$$

where:

$E_{expl}$ is the usable capacity of this battery BAT; and $SoC_0$ is the state of charge of the electric battery BAT at the time it is connected to the recharging device $T_E$ (meaning at time $t_A$ illustrated in FIG. 4).

The partial charging period Tx is then determined using the following equation (2):

$$E_{in} = \eta_{BAT} \cdot \eta_{chrgr} \int_0^{Tx} PFL(t)dt, \quad (2)$$

where:

$\eta_{BAT}$ is the efficiency parameter for the battery BAT, between 0 and 100%;

$\eta_{chrgr}$ is the efficiency parameter for the charger for this battery BAT, also between 0 and 100%; and PFL(t) is the charge profile for the battery BAT charging from the electrical grid.

The complete charging period Tcomp, corresponding to the time required for fully recharging the electric battery BAT from an empty state (a zero state of charge SoC) is then determined (step 220) based on the charge profile PFL(t) of the electric battery BAT.

In particular, this charging period Tcomp is calculated using the following equation (3):

$$E_{max} = \eta_{BAT} \cdot \eta_{chrgr} \int_0^{Tcomp} PFL(t)dt \quad (3)$$

where $E_{max}$ is the level of electrical energy reached at the end of this full charge, typically corresponding to the maximum charge level of the electric battery BAT. However, the invention is not limited to this case, and can also be applied to the case where $E_{max}$ is a level of electrical energy corresponding to a specific charge level that is different from the maximum charge level of the electric battery BAT.

The steps of determining 210 the partial charging period Tx and determining 220 the complete charging period Tcomp are not necessarily performed in the order indicated above, but may very well be performed in the reverse order, meaning with the determination of the complete charging period Tcomp preceding the determination of the partial charging period Tx.

Once the durations Tx and Tcomp have been determined, the charging duration $T_{100}$ necessary to achieve a full charge of the battery BAT containing residual energy $E_{in}$ can be determined (step 230) using the following equation:

$$T_{100} = T_{comp} - Tx \quad (4)$$

This duration $T_{100}$ can then be compared (step 240) to the duration of the available charging time period Td, to determine whether there is enough time to complete a full charge.

If this duration $T_{100}$ is less than the duration of the available charging time period Td, then it is advantageously possible to apply the optimized recharging method according to the present invention. On the other hand, if this duration $T_{100}$ is greater than the duration of the available charging time period Td, then a full and optimized recharging of the electric battery BAT is not possible.

In the latter case, a conventional recharging can be performed in which the charge profile PFL(t), shortened by duration Tx, is applied during the entire available charging time period Td, meaning where the charging schedule during this period Td is based on a charging power corresponding to P(t)=PFL(Tx+t).

To return to the optimized recharging method shown in FIG. 2, optionally after having verified that duration $T_{100}$ is smaller than the available charging time period Td, one or more charging time intervals $\Delta T_{chg}(1)$ to $\Delta T_{chg}(K)$ (where K is an integer greater than or equal to one) within the available charging time period Td initiated by the connection of the electric battery recharging system to the electric recharging device, are then determined (step 300), based on a load curve TLC associated with the electric recharging device $T_E$.

The electric battery BAT is then recharged (step 400) during the charging time interval(s) $\Delta T_{chg}(1)$ to $\Delta T_{chg}(K)$ in order to achieve optimized recharging of the electric battery BAT. This recharging is done according to the charge profile for the battery during the charging time interval(s) $\Delta T_{chg}(1)$ to $\Delta T_{chg}(K)$. This charge profile is thus divided into different periods placed at the most appropriate moments within period Td in light of the above constraints.

We will now refer to FIG. 4, which illustrates an implementation of both the determination step 300 and the electric battery BAT charging step 400 according to the present invention.

In particular, the determination step preferably comprises the sampling (step 310) of the load curve TLC associated with the electric recharging device $T_E$, over the available charging time period Td, in order to obtain a set $\{TLC(i)\}_{1 \le i \le n}$ of load curve power values TLC(1) to TLC(n) each associated with one of the consecutive time intervals ΔT(1) to ΔT(n) within the available charging time period Td.

This sampling is preferably periodic, repeated after a length of time corresponding to the duration of a charging time interval ΔT. A load curve power value TLC(i) is then associated with the time index i indicating the ith time interval ΔT(i) contained within the available charging time period Td.

At the end of this sampling phase, load curve power values TLC(1), ..., TLC(i), ..., TLC(n) are respectively associated with a succession of consecutive time intervals ΔT(1), ..., ΔT(i), ..., ΔT(n) which are themselves designated by a succession of time indexes 1, ..., i, ... n, satisfying the relation ΔT(i)=i*ΔT.

This sampling of the load curve TLC makes it possible to work in discrete time, especially when sorting the indexes associated with the load curve power values, which is more easily achieved using computerized means.

Once the load curve TLC is sampled, the load curve power values TLC(1) to TLC(n) are sorted (step 320) in ascending order so as to obtain a set $\{TTC(i)\}_{1 \le i \le n}$ of sorted load curve power values respectively associated with one of said time intervals ΔT(1) to ΔT(n).

Purely by way of example, if the following values are obtained by sampling the load curve every hour between 1 a.m. and 7 a.m.:

TLC(1)=75 kW
TLC(2)=80 kW
TLC(3)=70 kW
TLC(4)=65 kW
TLC(5)=65 kW
TLC(6)=60 kW
TLC(7)=70 kW the following sorted load curve power values are thus obtained:

TTC(1)=TLC(6)=60 kW;
TTC(2)=TLC(4)=65 kW;
TTC(3)=TLC(5)=65 kW;
TTC(4)=TLC(3)=70 kW;
TTC(5)=TLC(7)=70 kW;
TTC(6)=TLC(1)=75 kW; and
TTC(7)=TLC(2)=80 kW.

In this sort, when several load curve power values TLC(i) are identical, they can be sorted for example in chronological order, which is illustrated above with the values TLC(4) and TLC(5) which respectively give the sorted load curve power values TTC(2) and TTC(3).

The electric battery BAT is then recharged (step 400) for at least one charging time interval $\Delta T_{chg}(i)$ corresponding to a time interval ΔT(i) associated with the first sorted load curve power value TTC(1).

Recharging the electric vehicle $V_E$ during this charging time interval $\Delta T_{chg}(i)$ therefore affects the load curve TLC at one of its minimums during period Td, and thus avoids further raising the higher load values which would have too many detrimental effects on the electric recharging device $T_E$.

If necessary, the battery BAT can be recharged over several charging time intervals $\Delta T_{chg}(i)$ corresponding to time intervals ΔT(i) associated with the first sorted load curve power values TTC(1) TTC(2), etc. ..., in order to prioritize charging the battery BAT during the low periods in the load curve TLC of the electric recharging device $T_E$. This is particularly the case when recharging over a single charge interval $\Delta T_{chg}(i)$ is not sufficient for fully recharging the electric battery BAT.

Thus, in one embodiment, the charging of the battery BAT is performed during K charging time intervals $\Delta T_{chg}(1)$ to $\Delta T_{chg}(K)$ selected so as to correspond to the lowest periods in the load curve TLC of the electric recharging device $T_E$.

The number K is an integer, advantageously dependent on the level of residual electrical energy $E_{in}$ in the electric battery when this electric battery is connected to the electric recharging device, in order to allow fully recharging the electric battery BAT.

In particular, the number K can be determined from this level of residual electrical energy $E_{in}$ and from the charge profile PFL(t) of the electric battery, as follows:

the duration $T_{100}$ necessary for fully recharging the electric battery is determined from the level of residual electrical energy $E_{in}$ and from the charge profile PFL(t) of the electric battery, similarly to the above concerning the prior verification of the available charging time period;

this duration $T_{100}$ is divided by the duration ΔT of a sampling interval (e.g. 15 minutes), and the number K can be chosen as an integer that is strictly greater than the quotient of this division, preferably the integer corresponding to the first integer that is greater than this quotient in order to reduce the charging time to only what is necessary for fully charging the battery.

Once this number K is determined, the charging time intervals $\Delta T_{chg}(1)$ to $\Delta T_{chg}(K)$ are selected (step 330) from among all the time intervals ΔT(1) to ΔT(n), in order to correspond to the time intervals associated with the first values among the load curve power values TTC(1) to TTC(K) sorted in ascending order. In this manner the $\Delta T_{chg}(i)$ are selected so that they are in chronological order.

In the above example, for K=3, the fourth, fifth and sixth time intervals ΔT(4), ΔT(5) and ΔT(6), respectively associated with the load curve power values TLC(4), TLC(5) and TLC(6), will be selected as being the charging time intervals $\Delta T_{chg}(1)$ to $\Delta T_{chg}(3)$ during which the recharging of the electric battery is enabled.

For K=4, in addition to said time intervals ΔT(4), ΔT(5) and ΔT(6), a fourth charging time interval $\Delta T_{chg}(4)$ is selected from among the third and seventh time intervals associated with TLC(3) and TLC(7), namely ΔT(3) which corresponds to the fourth value TTC(4) of the sorted load curve power values.

Once the charging time intervals $\Delta T_{chg}(1)$ to $\Delta T_{chg}(K)$ are determined, the method then proceeds with recharging the electric battery BAT during these charging time intervals (step 400).

In the embodiment illustrated in FIG. 3, this recharging phase 400 comprises, for each consecutive time interval ΔT(1) to ΔT(n), verifying the correspondence between the time interval ΔT(j) in question and one of the charging time intervals $\Delta T_{chg}(1)$ to $\Delta T_{chg}(K)$ (substep 410).

If the time interval ΔT(j) is indeed one of the charging time intervals $\Delta T_{chg}(1)$ to $\Delta T_{chg}(K)$, then recharging the electric battery is activated (substep 420) during time interval ΔT(j).

On the other hand, if time interval ΔT(j) does not correspond to one of the charging time intervals $\Delta T_{chg}(1)$ to $\Delta T_{chg}(K)$, then recharging the electric battery is disabled (substep 430) during time interval ΔT(j). In other words, no recharging takes place outside the K time intervals $\Delta T_{chg}(1)$ to $\Delta T_{chg}(K)$.

This operation is repeated successively during each time interval ΔT(j) of the available charging time period Td, as represented by the loop incrementing the index j (substeps 441 and 443).

Thus, in this first embodiment, the electric battery BAT is recharged only during a certain number of time intervals corresponding to the minimum values in the load curve of the electric recharging device TE.

This embodiment is particularly suitable for the case where recharging is only time-optimized, with "all or nothing" control of the charge from the power supply terminal, where it is the electric system $V_E$ which manages the recharging with its battery management system (BMS) and therefore applies its charge profile with interspersed pauses.

In a preferred embodiment, charging is not enabled beyond a limit capacity value $P_{lim}$ (for example 80 kW), with load levels exceeding this value being considered unfavorable.

This limit capacity value $P_{lim}$ may be constant over the entire available charging period or may have variations, in which case a limit capacity value $P_{lim}(i)$ is associated with each time interval $\Delta T(i)$, the values $P_{lim}(i)$ possibly being different from each other.

In this embodiment, for each consecutive time interval $\Delta T(j)$, after having selected the time intervals $\Delta T(j)$ corresponding to one of the previously determined charging time intervals $\Delta T_{chg}(1)$ to $\Delta T_{chg}(K)$, the limit capacity value $P_{lim}(i)$ associated with the time interval $\Delta T(j)$ is compared to an estimated increased load value designated by TLC+VE(j), corresponding to the sum of the load value TLC(j) associated with the time interval $\Delta T(j)$ and the load pulled by the electric battery BAT recharging system.

Enabling (substep 420) the recharging of the electric battery therefore only occurs during time interval $\Delta T(j)$ if the estimated increased load value TLC(j)+VE(j) associated with this time interval $\Delta T(j)$ is less than the limit capacity value $P_{lim}(i)$, and if this time interval $\Delta T(j)$ additionally corresponds to one of the charging time intervals $\Delta T_{chg}(1)$ to $\Delta T_{chg}(K)$.

On the other hand, if the estimated increased load value TLC+VE(j) associated with this time interval $\Delta T(j)$ is greater than or equal to the limit capacity value $P_{lim}(i)$, then the recharging of the electric battery is disabled (substep 430) during time interval $\Delta T(j)$, whether or not that time interval $\Delta T(j)$ corresponds to one of the charging time intervals $\Delta T_{chg}(1)$ to $\Delta T_{chg}(K)$.

By thus preventing the recharging of the electric battery BAT within the areas of the load curve TLC that are greater than or equal to the limit capacity value $P_{lim}$, this embodiment protects the electric recharging device $T_E$, although with a possibly incomplete recharging of the electric battery BAT.

Figure 5:
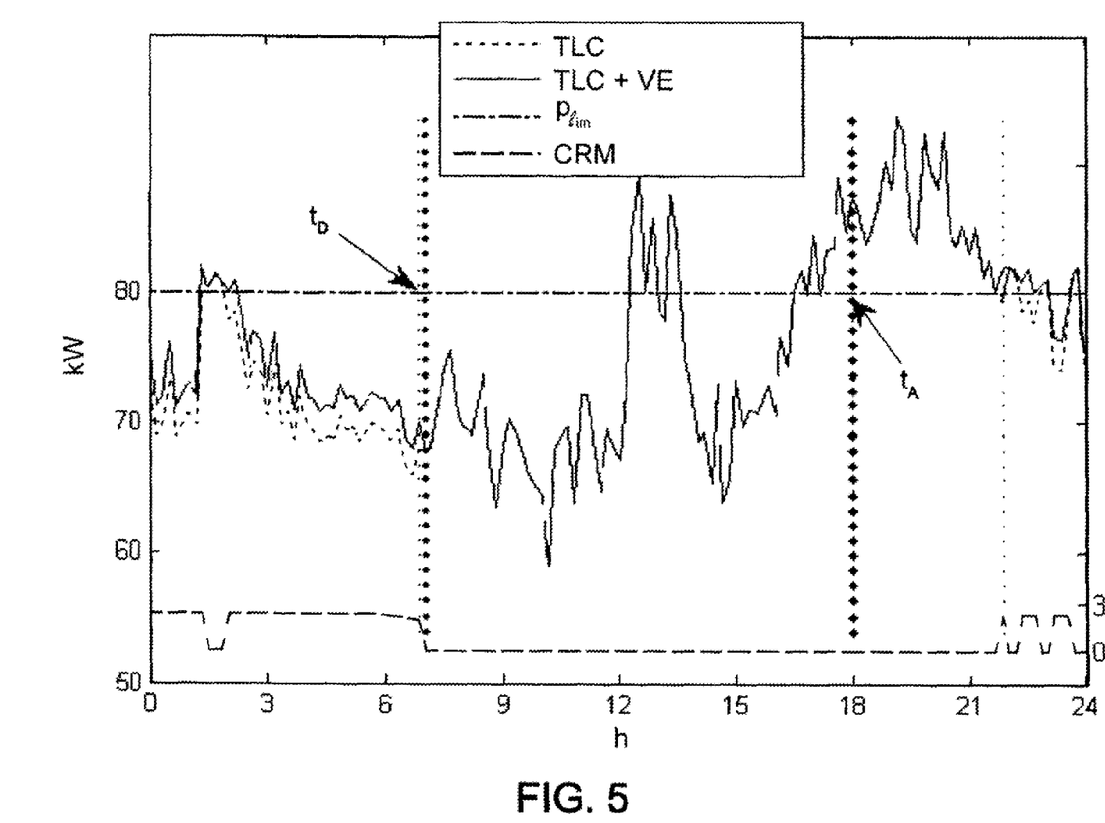
FIG. 5 represents a graph illustrating the positive effect obtained by using the recharging method of the invention.

FIG. 5 is a graph showing the positive effect obtained when using the optimized recharging method of the invention.

This graph shows the load curve TLC for a transformer over the course of an entire day, as well as the curve representing the change over time of the limit capacity $P_{lim}$ beyond which the load curve TLC causes harmful effects.

The time of arrival $t_A$ of the user at 6 p.m. (i.e. the moment when an electric vehicle $V_E$ is connected to the transformer) and the time of departure $t_D$ of the user at about 7 a.m. (i.e. the moment when the electric vehicle $V_E$ is disconnected from the supply terminal) are indicated, defining an available charging period Td that is equivalent to the interval $[t_A, t_D]$.

At the bottom of this graph one can see the curve CRM representing the alternating charge activation and deactivation phases over time, obtained by applying the optimized recharging method according to the invention.

It is clearly apparent in this curve CRM that optimized recharging is activated at charging time intervals located at 21:00, 22:00, and 23:00. In addition, optimized recharging is enabled more or less continuously between 0:00 and 7:00, except for a period around 1:30-2:00. Outside of these charging time intervals, recharging is disabled.

The resulting load curve, designated by TLC+VE, is illustrated as well. It is clear from this resulting load curve that it is mainly the low points in the load curve TLC, located below the limit capacity level $P_{lim}$, which are increased by the optimized recharging of the vehicle $V_E$. The load curve TLC is therefore smoothed by the method of the invention.

As a result, the increase in the load curve induced by recharging the vehicle $V_E$ is confined to the minimal load values in the load curve TLC, which limits the negative effects on the transformer, unlike the case where charging is continuously enabled throughout the period $[t_A;t_D]$. With the invention, power consumption due to charging occurs only during favorable moments (the lower values in the TLC).

The different steps of the optimized recharging method described above can be implemented by a program suitable for execution by a processing unit of an optimized recharging system, for example implemented as a computer or a data processor, said program comprising instructions for controlling the execution of the steps of a method as mentioned above.

In particular, the processing unit in question may be located within the optimized recharging device $T_E$ or within the electric system $V_E$, in order to locally manage the recharging of the electric vehicles.

Or the processing unit in question may be located remotely from the optimized recharging device $T_E$, in a remote computer system that is part of the optimized recharging system $S_E$, in order to manage the recharging centrally, which is appropriate for the case of a large fleet. In such a case, instructions are communicated to the optimized recharging device $T_E$ or to the electric system $V_E$ via various telecommunication networks in order to manage the optimized recharging.

As for the program, it can use any programming language, and may be in the form of source code, object code, or intermediate code between source code and object code, such as in a partially compiled form, or in any other desirable form.

The invention also concerns a medium readable by a computer or data processor, and containing the instructions of a program as mentioned above. This medium may be any entity or device capable of storing the program. For example, the medium may consist of a storage medium such as a ROM, for example a CD-ROM or a microelectronic circuit ROM, or a magnetic recording medium, such as a diskette or hard disk.

On the other hand, the medium may be a transmissible medium such as an electrical, optical, or electromagnetic signal, which may be conveyed via electrical or optical cable, by radio, or by other means. The program according to the invention may in particular be downloaded over a network such as the Internet. Alternatively, the medium may be an integrated circuit incorporating the program, the circuit being adapted to execute or to be used in executing the method in question.

The optimized recharging method of the invention is particularly advantageous for applications involving the recharging of electric batteries having no memory effect, partial charge disadvantages or contraindications from the manufacturer, this type of battery changing from a charge enabled state to a charge disabled state with a small transition period, and not necessarily recharging to 100%. The electric battery BAT can therefore advantageously be a Lithium-Ion battery.

Of course, the invention is not limited to the embodiments described and illustrated above; one can conceive of other embodiments and other implementations without departing from the scope of the invention.

The electric system was illustrated above in the form of an electric vehicle. However, the electric system $V_E$ can very well be in the form of any electric system having capacities for storing electrical energy, such as a mobile phone having a rechargeable battery.

The invention claimed is:

1. A method for the optimized recharging of the electric battery of at least one electric system by an electric recharging device, wherein the electric battery is destined to be recharged during at least one charging time interval which is part of an available charging time period initiated by connection of the electric battery recharging system to the electric recharging device, determined as a function of a load curve associated with said electric recharging device, wherein the method comprises:
determining said at least one charging time interval by:
sampling the load curve over the available charging time period in order to obtain a set of load curve power values respectively associated with consecutive time intervals of the available charging time period;
sorting, in ascending order, the load curve power values in order to obtain a set of sorted load curve power values respectively associated with one of said time intervals;
determining that said at least one charging time interval includes at least a time interval associated with the first value of the set of sorted load curve power values; and
recharging the electric battery during said at least one charging time interval.

2. The optimized recharging method according to claim 1, wherein said at least one charging time interval comprises K charging time intervals selected from among the time intervals associated with the first values of the sorted load curve power values, K being an integer greater than or equal to one, dependent on the level of electrical energy contained in the electric battery when the electric battery recharging system is connected to the electric recharging device.

3. The optimized recharging method according to claim 2, wherein the number K is determined based on the level of electrical energy contained in the electric battery when the electric battery is connected to the electric recharging device, and on a charge profile of said electric battery.

4. The optimized recharging method according to claim 1, wherein recharging the electric battery comprises, for each of the consecutive time intervals:
enabling the recharging of the electric battery during the time interval if said time interval is one of the charging time intervals, and
disabling the recharging of the electric battery during the time interval if said time interval is not one of the charging time intervals.

5. The optimized recharging method according to claim 4, wherein recharging the electric battery further comprises, for each of the consecutive time intervals, comparing the load value associated with said time interval to a limit capacity value;
enabling the recharging of the electric battery during the time interval only if the load value associated with said time interval is less than the limit capacity value, and
disabling the recharging of the electric battery during the time interval if the load value associated with said time interval is greater than or equal to the limit capacity value.

6. The optimized recharging method according to claim 1, wherein the available charging time period is determined from the moment when the electric battery recharging system is connected to the electric recharging device and from an indication concerning a charging end time provided by the user of the electric system.

7. The optimized recharging method according to claim 1, comprising a prior verification of the duration of the available charging time period as a function of the length of time necessary for fully recharging the electric battery, with the recharging of the electric battery during at least one charging time interval occurring only if the duration of the available charging time period is greater than the length of time necessary for fully recharging the electric battery.

8. The optimized recharging method according to claim 1, wherein the electric battery has substantially no memory effect.

9. The optimized recharging method according to claim 8, wherein the electric battery is a Lithium-Ion battery.

10. The optimized recharging method according to claim 1, wherein the electric system is an electric vehicle.

11. A non-transitory computer readable storage medium, having stored thereon a computer program comprising program instructions, the computer program being loadable into a data-processing unit and adapted to cause the data-processing unit, when the computer program is run by the data-processing device, to carry out a method for the optimized recharging of the electric battery of at least one electric system by an electric recharging device, wherein the electric battery is destined to be recharged during at least one charging time interval which is part of an available charging time period initiated by connection of the electric battery recharging system to the electric recharging device, determined as a function of a load curve associated with said electric recharging device, wherein the method comprises:
determining said at least one charging time interval by:
sampling the load curve over the available charging time period in order to obtain a set of load curve power values respectively associated with consecutive time intervals of the available charging time period;
sorting, in ascending order, the load curve power values in order to obtain a set of sorted load curve power values respectively associated with one of said time intervals; and
determining that said at least one charging time interval includes at least a time interval associated with the first value of the set of sorted load curve power values; and
recharging the electric battery during said at least one charging time interval.

12. An optimized recharging device for recharging the electric battery of at least one electric system, connected to an electrical grid and comprising at least one connection port suitable for connection to the electric battery recharging system, the device being configured, after the electric battery recharging system is connected to the connection port of the optimized recharging device, to implement a method for the optimized recharging of the electric battery of at least one electric system by an electric recharging device, wherein the electric battery is destined to be recharged during at least one charging time interval which is part of an available charging time period initiated by connection of the electric battery recharging system to the electric recharging device, determined as a function of a load curve associated with said electric recharging device, wherein the method comprises:
determining said at least one charging time interval by:
sampling the load curve over the available charging time period in order to obtain a set of load curve power values respectively associated with consecutive time intervals of the available charging time period;

sorting, in ascending order, the load curve power values in order to obtain a set of sorted load curve power values respectively associated with one of said time intervals; and determining that said at least one charging time interval includes at least a time interval associated with the first value of the set of sorted load curve power values; and recharging the electric battery during said at least one charging time interval.

13. The optimized recharging system for recharging an assembly composed of at least one electric system comprising an electric battery, the optimized recharging system comprising an electrical grid and at least one electric recharging device according to claim 12, connected to said electrical grid.

14. The optimized recharging system according to claim 13, further comprising a remote computer system, connected to the electric recharging device and comprising a processing unit suitable for controlling said electric recharging device to carry out the steps of said method.

* * * * *